United States Patent [19]

Samolis

[11] 4,097,255

[45] Jun. 27, 1978

[54] GAS FILTER CLEANING APPARATUS

[76] Inventor: Alfonso A. Samolis, 329 Carnaritas Way, Danville, Calif. 94526

[21] Appl. No.: 784,154

[22] Filed: Apr. 4, 1977

[51] Int. Cl.$^2$ .............................................. B01D 46/04
[52] U.S. Cl. .......................................... 55/294; 55/302
[58] Field of Search ................... 55/96, 283, 294, 302, 55/303; 210/333.1

[56] References Cited

U.S. PATENT DOCUMENTS

| 3,169,109 | 2/1965 | Hirs | 210/333.1 |
| 3,395,517 | 8/1968 | Lang et al. | 55/294 |
| 4,007,026 | 2/1977 | Groh | 55/302 |

FOREIGN PATENT DOCUMENTS

| 1,600,045 | 8/1970 | France | 55/294 |

OTHER PUBLICATIONS

Pulseflo — Joy Mfg. O — Western Precipitation Div. Catalogue No. PF-100 dfd 03/24/70 pp. 1–4.

*Primary Examiner*—Bernard Nozick
*Attorney, Agent, or Firm*—Thomas H. Olson

[57] ABSTRACT

A system for producing a reverse blast of air to dislodge from an air-filter element contaminents that are captured on the surface of the element in response to forward flow through the element. A manifold pipe spanning one or more openings at the outlet end of the filter elements and a nozzle supported on the manifold pipe in alignment with each element opening. Associated with the nozzle and secured to the manifold pipe for rotation in unison therewith is a venturi which, when rotated into an active position substantially covers the opening so that when air is supplied through the manifold pipe to the nozzle, the reverse blast is effective in dislodging contaminents on the exterior of the element. The manifold pipe is rotatable to an inactive position at which the venturi and nozzle are virtually clear of the outlet openings so as to avoid impedence to air flow through the filter.

3 Claims, 3 Drawing Figures

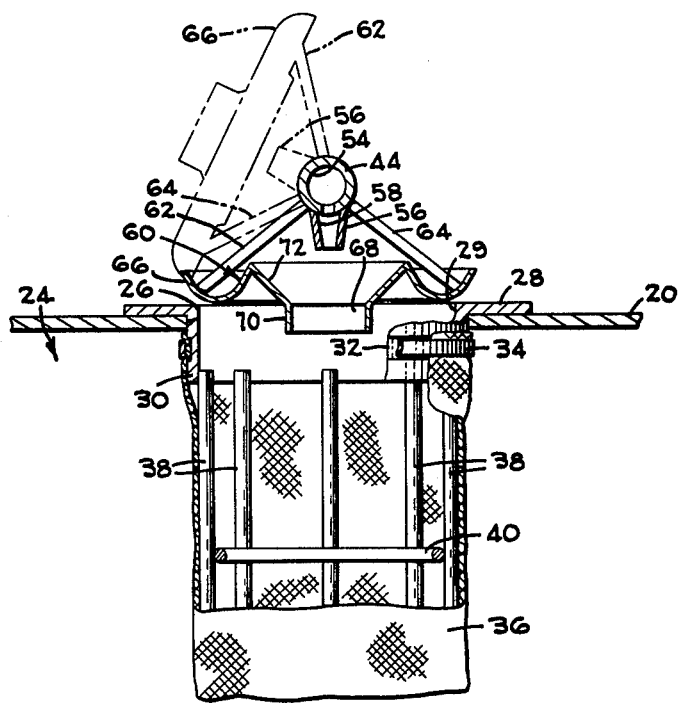
Fig_2
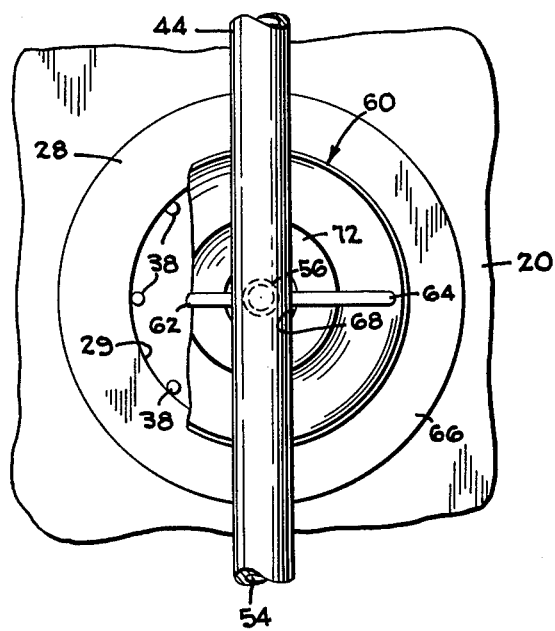
Fig_3

GAS FILTER CLEANING APPARATUS

BACKGROUND OF THE INVENTION

1. Field of the Invention

This invention relates to apparatus for applying a reverse pulse of air to an air filter element to dislodge contaminents captured on the exterior surface of the element and more particularly, to such device that can be pivoted away from the element so as to reduce impedence to forward air flow during normal operation of the filtering apparatus.

2. Description of the Prior Art

U.S. Pat. No. 3,798,878 (55/96) discloses filter apparatus in which the present invention can be employed. The cleaning apparatus in the U.S. Pat. No. 3,798,878 employs a venturi which is disposed in fixed relation to the outlet of the filter element. The patented device, while effective in producing a reverse pulse for cleaning the filter element, unduly impedes gas flow in the forward direction since it is immovably supported within the outlet of the filter element.

U.S. Pat. No. 3,626,674 discloses a series of pivotally supported vanes which cooperate with reciprocating elements to produce a reverse blast. The patented device, in addition to having many moving parts, unduly restricts air flow in the forward direction.

U.S. Patent No. 3,891,418 discloses a reverse blast system employing fixed venturis which impede flow in the forward direction.

U.S. Pat. No. 3,838,555 discloses a filter device wherein the reverse blast is applied from both ends of the filter element by means of a complicated valving arrangement operating in connection with a fixed nozzle structure.

U.S. Pat. No. 3,693,467 discloses a backflow cleaning device requiring a plurality of individual air passages and a pneumatically operated disc valve associated with each filter element.

U.S. Pat. No. 3,601,704 discloses a filter screen and a diametrically extending rotatively driven tube having nozzles for applying a continuous reverse blast to selected portions of the filter screen.

SUMMARY OF THE INVENTION

The present invention finds utility in existing air or gas filtering systems which include an enclosure into which contaminated gas or air is introduced. Suspended within the enclosure is a plurality of cylindric porous elements which have hollow interiors so that, as the contaminated air or gas passes from the exterior of the element to the hollow interior thereof, the contaminents are entrapped on the exterior surfaces of the elements. The clean air or gas then exits an outlet opening at one end of the cylinder from which it is conveyed through a plenum to the outlet of the filtering apparatus. The porous filter elements are typically aligned in a plurality of straight rows. The present invention provides a manifold pipe extending along each row. The manifold pipe has a nozzle in alignment with each element outlet and a venturi device for cooperating with the nozzle to improve reverse air flow. The venturi is secured to the manifold pipe for rotation therewith in unison with the nozzle.

An object of the present invention is to provide an air filter system which, when in the inactive position, creates little or no impedance to forward gas flow through the filter system in which it is installed. This object is achieved because the nozzle and venturi, which are secured to the manifold, are rotated to a position remote from the filter element outlet except when a reverse air blast is supplied to a particular row of elements.

Another object is to provide a venturi which can be fabricated from one stamped part. This object is achieved because the venturi, being pivoted out of the path of forward air flow, can be designed without regard to its reverse flow characteristics. Accomplishment of this object has the advantage of providing efficient filter cleaning operation at minimum cost with a minimum number of parts.

A further object of the invention is to provide a filter cleaning apparatus having a minimal number of moving parts. This object is achieved because all reverse nozzles associated with a given row of filter elements are supported on a single manifold pipe which can be rotated by a relatively simple mechanism exterior of the filter enclosure.

Still another object is to provide a filter cleaning system that can be adapted to existing filter installations. This object is achieved because the radial extent of the nozzles and the venturis is limited, whereby the outlet plenums in most, if not all, existing filter apparatus afford sufficient volume for installation of the apparatus of the invention.

The foregoing, together with other objects, features and advantages of the invention, will be more apparent after referring to the following specification and the accompanying drawings.

BRIEF DESCRIPTION OF THE DRAWING

FIG. 2 is a cross-sectional elevation view through the outlet of one filter element showing the details of the cleaning apparatus of the invention.

FIG. 3 is a fragmentary top view of FIG. 2.

DESCRIPTION OF THE PREFERRED EMBODIMENT

Figure 1:
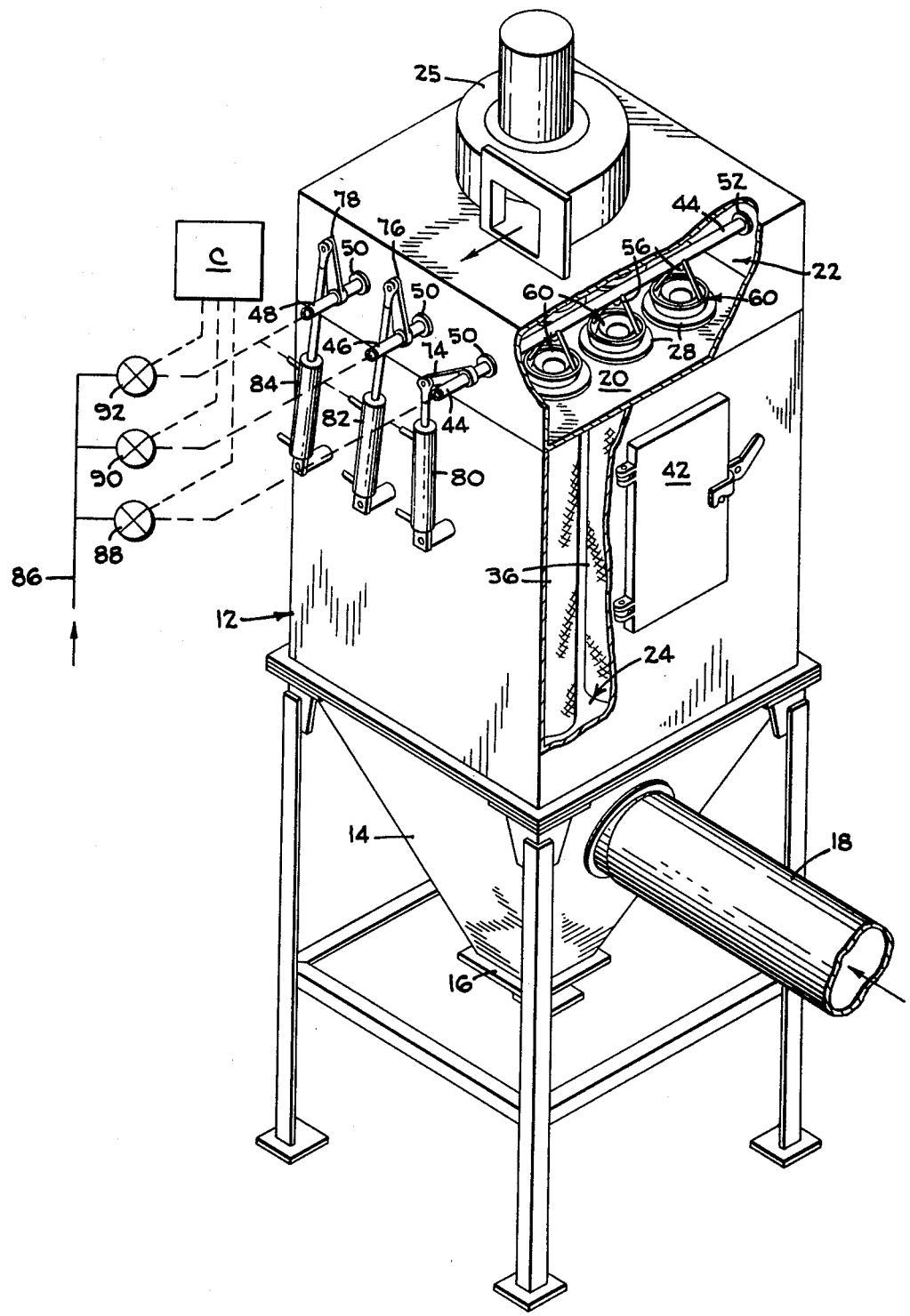
FIG. 1 is a perspective view of an air filter system equipped with the cleaning apparatus of the invention, portions being broken away to reveal internal details.

Referring more particularly to the drawing, reference numeral 12 generally indicates the enclosure for an air filter unit of more or less conventional form. Enclosure 12 includes a pyramidal shaped hopper 14 at the lower extremity of which is an outlet 16 toward which contaminents captured in the filter apparatus gravitate. Communicating with the interior of the enclosure through a wall of pyramidal hopper 14 is an inlet duct 18. The upper portion of enclosure 12 is of rectangular cross-section and has an impervious planar wall 20 above which is defined a clean air outlet plenum 22 and below which is defined the main filtering chamber 24 of the apparatus. An outlet fan 25 communicates with clean air plenum 22 to draw clean air therefrom. Wall 20 is formed with a plurality of circular openings 26 in each of which a flange 28 is supported. Each flange 28 forms an outlet opening 29 and has a depending cylindrical skirt 30 which extends into chamber 24. The exterior surface of the skirt defines a circumferential groove 32. Cooperating with groove 32 is a strap 34 which retains the porous filter element onto flange 28.

Exemplifying such porous filter element is a woven fabric bag 36 having a weave suitable for retarding flow therethrough of the contaminants entrained in the gas entering inlet 18. Bag 36 is of cylindrical form and is closed at the bottom. The upper end of the bag is open and has a diameter such as to telescope onto the exterior surface of sleeve 30 to be there retained by coaction of strap 34 and groove 32. Secured to the interior surface of skirt 30 is a rigid framework composed of axially extending rods 38 and circumferentially extending rods 40. Rods 38 and 40 are spaced close enough to retain filter bag 36 in a generally cylindric form against the air pressure applied exteriorly thereof but are spaced far enough from one another to avoid substantial impedance to air flow therethrough. Enclosure 12 has an access door 42 for affording access to chamber 24 for replacement or maintenance of the filter elements.

In the example depicted in FIG. 1 there are three rows of filter elements each of which row has three openings 26 and flanges 28. Spanning the openings in the respective rows are substantially identical manifold pipes 44, 46 and 48. Because the manifold pipes and other elements associated therewith are identical, a detailed description of one will suffice as a description of all. Manifold pipe 44 is journaled for rotation in bearings 50 and 52 in the sidewalls of plenum chamber 22. Bearings 50 and 52 include seals to prevent leakage of air through the bearings. In addition, the bearings are arranged to eliminate axial movement of manifold pipe 44 for reasons which will appear. Manifold pipe is hollow and thus defines a longitudinally extending gas passage 54 therealong. Fixed to manifold pipe 44 at spaced locations corresponding to the center to center distance between element outlet openings 29 are nozzles 56. Nozzles 56 define gas passages 58 which extend radially of the axis of rotation of manifold pipe 44 and communicate with passage 54 in the manifold pipe. In alignment with each nozzle 56 is a venturi indicated generally at 60, the venturi being sedured to manifold pipe 44 for rotation in unison with nozzle 56 by radially extending arms 62 and 64.

Venturi 60 is of unitary construction and can be formed from one sheet of impervious material such as sheet steel. The venturi includes a peripheral portion 66 which has a radius of curvature with respect to the axis of rotation of manifold pipe 44 such that the entire structure, including the venturi, can be rotated to the broken line position shown in FIG. 2. The radius of curvature is of a magnitude such that when the venturi is in an active position, depicted by solid lines in FIG. 2, it more or less seals outlet 29. As can be seen in FIG. 3, peripheral portion 66 is substantially congruent to opening 29 so that there is a small uniform gap continuously throughout the periphery thereof. Centrally of peripheral portion 66 the venturi defines an opening 68 which is substantially coaxial with opening 58 of nozzle 56. Depending from opening 68 is a cylindric sleeve 70 which has a radial extent, measured from the central axis of manifold pipe 44, no greater than the radial distance from the axis to the rim of outlet 29, thereby avoiding interference with rotation of the venturi to the passive position. Upward of opening 68, venturi 60 has a diverging wall portion 72 which cooperates with the air blast passing through passage 58 of nozzle 56 to entrain additional air from plenum chamber 22 when air is supplied through the nozzle.

Externally of the sidewall of plenum 22 through which manifold pipes 44, 46 and 48 extend, the manifold pipes are fitted with means for controllably rotating each manifold pipe between a position at which the nozzle and venturi affixed thereto are active to supply a reverse air pulse to the filter element (depicted in solid lines in FIG. 2) and a position at which the nozzle and venturi are passive to forward air flow (depicted in broken lines in FIG. 2). Exemplifying such rotating means are crank arms 74, 76 and 78 secured to respective manifold pipes 44, 46 and 48. To the free ends of the respective crank arms are secured the piston rods of pneumatic actuators 80, 82 and 84. Application of air pressure to the upper inlet fitting of the actuators rotates the manifold pipe to move the respective nozzles and venturis affixed thereto to the active position, such position being exemplified by pneumatic actuator 80 in FIG. 1. Application of air pressure to the lower inlet fitting of the respective pneumatic actuators moves the associated manifold pipe and nozzles and venturis to the passive position, exemplified by actuators 82 and 84 in FIG. 1. For supplying compressed air to the actuators and to the manifold pipes, compressed air from the source not shown is supplied through an inlet manifold schematically indicated at 86, the air being controllably supplied to the respective manifold pipes and actuators through the solenoid valves 88, 90 and 92. Solenoid valves 88, 90 and 92 are typically sequentially activated at prescribed intervals by control circuitry C which is shown schematically since the details of such circuitry are conventional and form no part of the present invention.

In operation, inlet 18 is connected to a source of contaminated air or gas and the outlet of fan 25 is connected to a duct through which clean air is to be conducted. Air entering inlet 18 enters chamber 24 and travels radially through filter elements 36 to the hollow interior of the filter elements. The air then passes upward through outlets 29 into plenum chamber 22 and then through fan 25. When all nozzles and venturis are in the passive position (depicted by broken lines in FIG. 2), there is virtually no resistance to flow of the filtered air as it egresses through outlets 29 of the filter elements. Continuation of operation of the filter apparatus in this manner causes accumulation of contaminants on the exterior surface of filter elements 36, which contaminants increase resistance to air flow through the apparatus. The present invention provides for a periodic reverse air blast through the porous elements 36 to dislodge the contaminants on the exterior surfaces of the filter elements so that they can fall by gravity to hopper 14 of enclosure 12. Initially, air is supplied through valve 88 to the upper inlet of pneumatic actuator 80 to move the nozzles and venturis associated with manifold pipe 44 into the active position, (depitced in solid lines in FIG. 2). With the nozzles and venturis moved to the active position, compressed air is supplied through passage 54 of manifold pipe 44 and thence through passages 58 in the respective nozzles 56. The air blast causes a reverse flow through porous filter elements 36 and dislodges the contaminant particles disposed on the exterior surface of the porous element. Air flow from nozzle passage 58 through venturi 60 entrains air from plenum chamber 22 so that the total quantity of reversely flowing air exceeds the quantity introduced through the nozzle opening. The compressed air supply to the manifold pipes can be of any magnitude suitable to perform the above-mentioned function, pressures between 70 and 90 psi having been found satisfactory in installations in which the passages 58 and nozzles 56 are sized to deliver approximatey 0.30 cubic feet per minute. Improved reverse flow can be achieved by constructing control circuitry to pulse intermittently the compressed air supplied to the manifold pipe in cycles having durations of approximately 0.10 to 0.90 seconds. These parameters are exemplary only because the specific pressures and cycling thereof will vary depending on the size of the porous elements, the relative porosity of the elements and the nature of the contaminant particles entrapped on the exterior surface of the elements. During application of the reverse blast to the porous elements associated with manifold pipe 40, the nozzles and venturis associated with manifold pipes 46 and 48 are retained in the inactive position so that continuous air flow in a forward direction through the apparatus is maintained.

When the filter elements associated with manifold pipe 44 have been cleaned, pneumatic actuator 80 is activated to move the nozzles and venturis to the passive position and next actuator 82 is operated to move the nozzles and venturis associated with manifold pipe 46 to the active position. When the filter elements associated with the latter manifold pipe have been cleaned, the process is repeated to the end that some of the elements can be subjected to a reverse air blast and the balance of the elements can function to filter air moving in the forward direction through the apparatus. Flow in the forward direction is not impeded because the venturis are pivoted to the passive position away from outlet openings 29.

Thus, it will be seen that the present invention provides an extremely efficient and uncomplex apparatus for applying reverse air blast to filter elements. More importantly, the invention provides a reverse blast cleaning apparatus in which the venturis, when in the passive position afford virtually no impedance to air flow through the apparatus in the forward direction. Because of the construction of the apparatus of this invention, existing air filters can be modified to incorporate the invention with minimal cost and disruption of the system. Although one embodiment has been shown and described, it will be obvious that other adaptations and modifications can be made without departing from the true spirit and scope of the invention.

What is claimed is:

1. In a gas filter of the type including at least one porous element having a hollow interior and a circular outlet communicating with the hollow interior, means for directing contaminated gas to the exterior of said element for flow radially through said element, into the interior and means communicating with the outlet for conducting filtered gas therefrom, improved apparatus for periodically producing a reverse blast to dislodge contaminates from the exterior of said element comprising a nozzle, means for supporting said nozzle adjacent said outlet for pivotal movement about an axis spanning the outlet between an active position at which the nozzle is directed toward said interior and a passive position at which the nozzle is pivoted about said axis away from said outlet, a venturi having an opening aligned with said nozzle, means for mounting said venturi to said supporting means for pivotal movement in unison with said nozzle, said venturi including a substantially impervious member having a marginal portion substantially congruent to said outlet so as substantially to seal said outlet when in said active position, said marginal portion having a radius of curvature relative to said axis to afford movement of said venturi between said active and passive positions, said venturi defining a central opening substantially coaxial with said nozzle, and a sleeve portion surrounding said central opening and extending toward said outlet, said sleeve portion terminating in an orifice disposed radially inward of said marginal portion to avoid interference of movement of said venturi between said active and passive positions, and means for supplying compressed gas to said nozzle in the active position.

2. In a gas filter of the type including at least one porous element defining a generally hollow interior of cylindric configuration having a substantially circular outlet opening at one axial end thereof, means for directing contaminated gas to the exterior of said element for flow radially through said element into the interior, means defining a plenum communicating with said circular outlet opening for conducting filtered gas from said element, said plenum defining means having a planar wall, and means for supporting the element with the circular outlet opening in substantially coplanar relation to said wall, improved apparatus for periodically producing a reverse blast to dislodge contaminates from the exterior of said element comprising a manifold pipe, means for supporting said manifold pipe in spaced-apart relation externally of said hollow interior for rotation on an axis parallel to a diameter of said circular outlet opening, a nozzle secured to said manifold pipe in axial alignment with the center of said circular outlet opening and having a passage extending radially of said axis, a venturi and means for securing said venturi to said manifold pipe for rotation in unison therewith, said venturi including an imperforate marginal portion having a convex arcuate surface substantially congruent to said circular outlet opening and radially spaced from said manifold pipe by an amount to substantially seal said circular outlet opening when said venturi is pivoted to an active position overlying said circular outlet opening, said convex arcuate surface being concentric with said axis to afford pivotal movement of said venturi away from the circular outlet opening, said venturi defining a central opening substantially coaxial with said marginal portion and said nozzle and having a sleeve portion surrounding said central opening and extending toward said outlet, said sleeve portion terminating in an orifice disposed radially inward of said marginal portion to avoid interference of rotation thereof, means for rotating said manifold pipe between an active position at which the nozzle is directed toward said interior and a passive position at which the nozzle is pivoted about said axis away from said circular outlet opening, and means for supplying compressed gas to said nozzle in the active position.

3. Apparatus according to claim 2 wherein said venturi has a diameter greater than the radial dimension thereof, whereby said venturi can be fabricated from one stamped part.

* * * * *